United States Patent Office 3,287,539
Patented Nov. 22, 1966

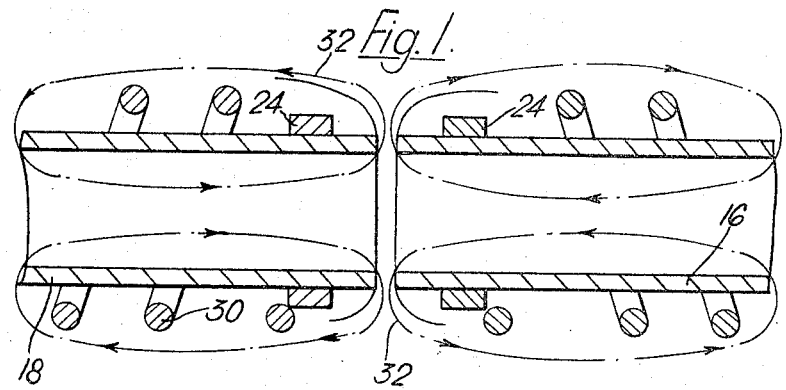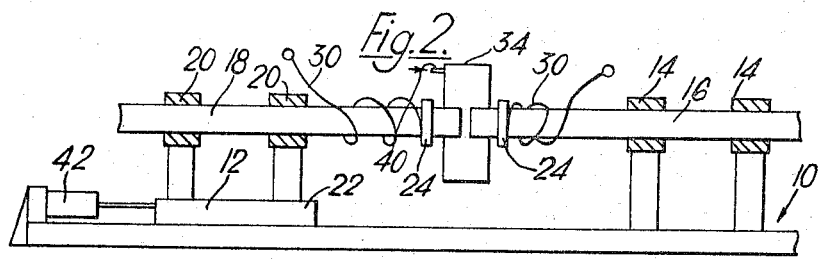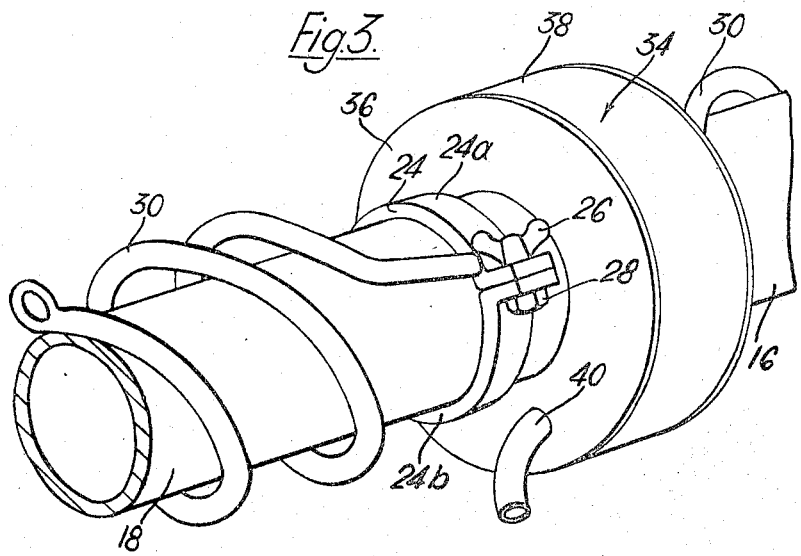

3,287,539
TUBE WELDING BY ROTATING ARC
Alan Ernest Stevens, Wokingham, England, assignor to Foster Wheeler Corporation, New York, N.Y., a corporation of New York
Filed Mar. 23, 1966, Ser. No. 536,793
5 Claims. (Cl. 219—100)

This invention relates to a method of making a ring-shaped butt weld such for example as a weld between the ends of two tubes, or a tube and a stub, header or tube plate.

In the known process of flash butt welding a number of arcs are formed at points spaced around the joint and the two parts being welded are moved towards and away from one another many times in an attempt to distribute the heat evenly around the joint. After heating the joint in this way a weld is formed by pressing the parts together.

Even operating in this way it is still very difficult to get a uniform heating of the joint.

According to the present invention, this difficulty is overcome by striking an arc between the surfaces to be welded together in the presence of a magnetic field which causes the arc to travel round the ring during the heating process. By means of a magnetic field of appropriate form it is possible to cause the arc to travel round the ring very rapidly and thus to produce an extremely uniform heating effect.

A magnetic field of suitable form can be conveniently produced by leading the welding current to the joint through two coils which pass round the ends of the parts to be welded together, the two coils being wound in opposite directions so that they produce opposed magnetic fields. This produces a resultant magnetic field which passes through the gap between the surfaces to be joined in a generally radial direction. The magnetic field thus intercepts the arc and produces an electromagnetic thrust which drives the arc round the joint. The coils may be made of copper rod or tubing and may be attached to the work by means of ring-shaped copper clamps which lead the current from the coils to the work. The invention is not confined to any particular method of producing the magnetic field. It is even possible to use a permanent magnetic system.

During the process of welding, the region where the joint is to be formed is shrouded in an inert shielding gas such as argon. The surfaces to be welded are rapidly heated by striking a rapidly rotating arc between them and are thrust together when they have been sufficiently heated, so as to form a butt weld. Owing to the speed and uniformity with which heat is supplied by the rotating arc, it is possible to restrict the heat affected zone to a region very near the actual joint.

An example of butt welding two tubes in accordance with the invention will now be described, by way of example, with reference to the accompanying drawings, in which:

FIGURE 1 is a diagrammatic section of the ends of the tubes to be butt welded;

FIGURE 2 is a diagrammatic elevation of the two tubes held on an apparatus to effect the weld; and FIGURE 3 is a perspective detail of the two ends of the tubes to be welded together.

The apparatus 10 shown in FIGURE 2 comprises a base 12 which carries a pair of fixed clamps 14 for holding one of the two tubes 16 and 18 to be butt welded and a further pair of clamps 20 for holding the other of the two tubes, the clamps 20 being mounted on a member 22 which is slidable along the base 12. The two tubes 16 and 18 are held so that their two ends which are to be welded together are axially aligned with respect to one another and spaced apart by about 1/8", although the exact distance will depend upon the welding current which is to be used.

A copper clamp 24 firmly grips each tube near its end to be welded so as to afford good electrical contact with the tube, the two halves 24a and 24b, of the clamp being held together around the tube by wing nuts 26 threaded onto screws 28. Joined to each clamp 24 is a length of thick copper wire 30 which is bent into a spiral around its respective tube. As shown in the drawing about two complete turns are used although this is not critical. The ends of the wires are provided with connectors or terminals and the welding current is applied between the ends of the wires.

The wires 30 do not contact the tubes but when a welding current is passed through them they produce a magnetic field. It will be seen that the wires are coiled in opposite directions around each tube. During welding this produces opposed magnetic fields in the two tubes and the resultant magnetic field is then approximately radial with respect to the two tubes in the region of their ends to be welded. Some magnetic lines of force 32 are shown diagrammatically in FIGURE 1 in the region of the tube ends.

In order to weld the tubes together an arc is struck between the two ends of the tubes and it is caused to rotate extremely rapidly around the ring-shaped gap between the ends by the magnetic field in this gap produced by the welding current passing through the lengths 30 of wire. This rapid rotation of the arc gives a very uniform heating all the way round the ends of the tubes. Because the heating is so uniform the amount of heat which has to be applied to the ends of the tubes is far less than is necessary with the conventional flash butt welding and as a result the length of tube which is heated is shorter.

In order to prevent oxidation of the heated ends of the tubes they are shielded by argon gas during welding. For this purpose the heated ends of the tubes are surrounded by a shield 34 comprising end discs 36 which fit over the tubes and a cylindrical surround 38 held between the discs. Argon is fed to the weld region through an inlet 40 in one of the discs 36, although the argon could equally well be applied through one of the tubes to be welded.

Once the two ends of the tubes 16 and 18 have been sufficiently heated, which with normal arc welding currents takes about 2½ seconds, the welding current is switched off, and the two ends are thrust together so as to unite the tubes to one another. To do this the slide 22 is moved along the base 12 by means of an hydraulic cylinder 42 working between the base and the slide, the slide being guided in a channel (not shown) in the base so as to keep the tubes aligned.

The welding current used can be D.C. or A.C.

I claim:

1. A method of making a ring-shaped butt weld between two tubes comprising the steps of holding said tubes axially aligned with a space between their ends to be welded, surrounding at least part of each tube with a coil, connecting one end of each of said coils to the tube it surrounds and supplying a source of welding current between the other ends of said coils, striking an arc between said ends of said tubes, so that the magnetic field produced by said coils causes said arc to travel around said space between said ends of said tubes to heat said ends, switching off said welding current and immediately bringing said ends of said tubes together to unite them.

2. A method according to claim 1 in which said ends of said tubes are shrouded with an inert gas during welding.

3. An apparatus for making a ring-shaped butt weld between two ring-shaped surfaces comprising means for holding parts carrying said surfaces in spaced axial alignment, a separate coil means around each part, one end of each coil means being in electrical contact with the part it is around, supply means arranged to supply welding current between the other ends of said coil means, whereby an arc can be struck between said surfaces and caused to travel around them by the magnetic field produced by said coil means, and hydraulic means for thrusting said parts together so as to unite said surfaces together.

4. An apparatus according to claim 3 further comprising a shield surrounding coil surfaces, and means for supplying an inert gas to said shield to shroud said surfaces with an inert gas during welding.

5. A method of making a ring-shaped butt weld between two ring-shaped surfaces comprising holding parts having ring-shaped surfaces in spaced axial alignment, surrounding at least part of each part with a coil, connecting one end of each of said coils to the part it surrounds and supplying a source of welding current between the other ends of said coils, striking an arc between said ends of said tubes, so that the magnetic field produced by said coils causes said arc to travel around said space between said ring-shaped surfaces of said parts to heat said ring-shaped surfaces, and bringing said ring-shaped surfaces together to unite them.

References Cited by the Examiner

UNITED STATES PATENTS

| 2,280,800 | 4/1942 | Dawson | 219—97 |
| 2,286,210 | 6/1942 | Klemperer | 219—97 |
| 2,472,851 | 6/1949 | Landis et al. | 219—123 X |
| 2,477,582 | 8/1949 | Dawson | 219—97 |

RICHARD M. WOOD, *Primary Examiner.*